Figure 1:
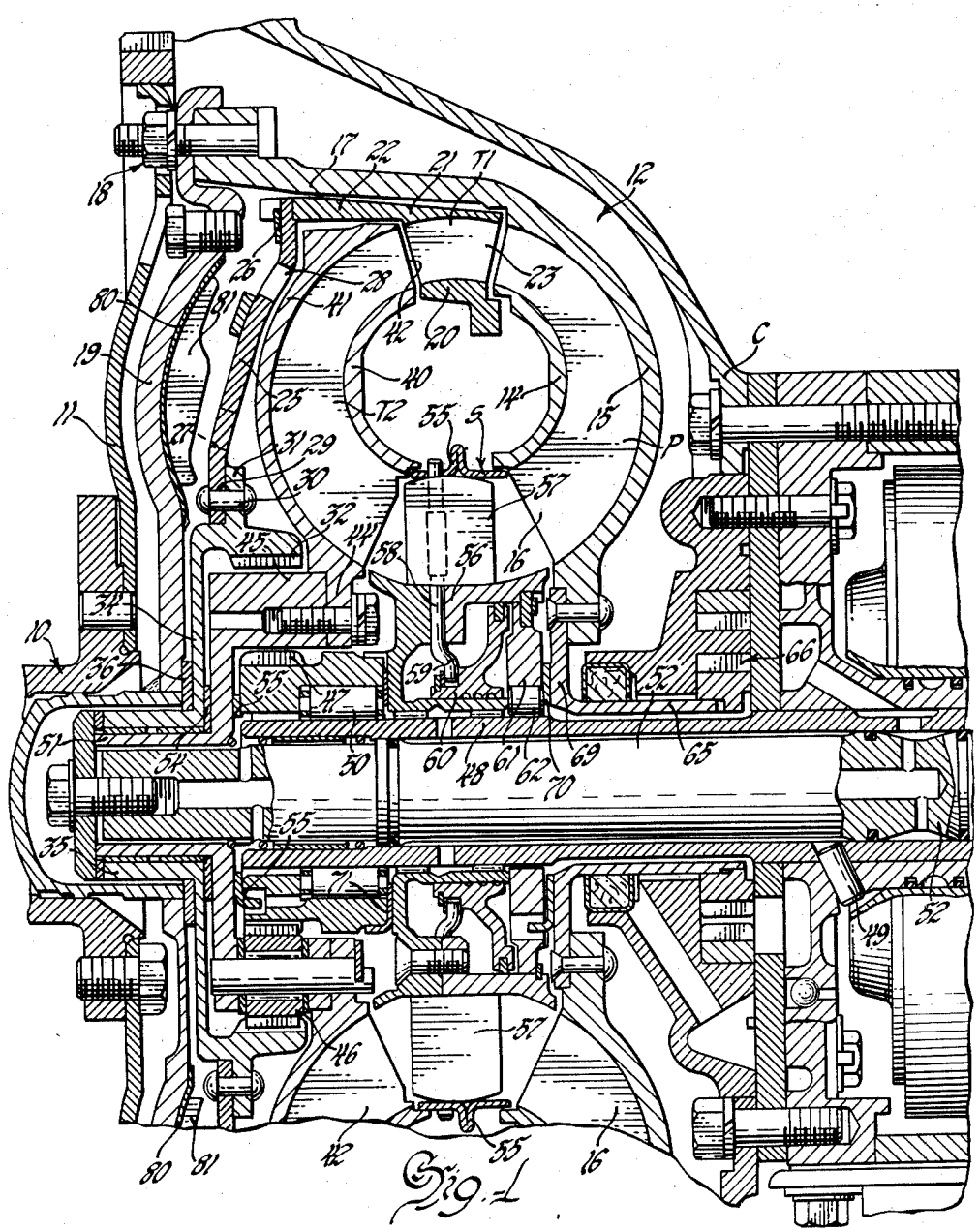

INVENTOR
Oliver K. Kelley
BY W. C. Middleton
ATTORNEY

United States Patent Office 2,910,832
Patented Nov. 3, 1959

2,910,832

HYDRODYNAMIC TORQUE CONVERTERS

Oliver K. Kelley, Birmingham, Mich., assignor to General Motors Corporation, Detroit, Mich., a corporation of Delaware Application July 22, 1954, Serial No. 444,973

3 Claims. (Cl. 60—54)

This invention relates to improvements in hydrodynamic torque converters and more particularly to such converters having two or more turbines therein connected together for drive purposes by a planetary gear set.

In the operation of torque converters it has been found that the fluid circulated by the pump thereof develops axial components of force, particularly when some of the elements of the converter are at rest, which components may act in such fashion as to impose undue strain and wear on thrust bearings, etc.

An object of the present invention is to provide a torque converter so constructed that the axial components of force developed by the liquid circulated by the pump are substantially balanced.

Another object of the invention is to provide a converter as before described in which the outer shroud of the pump is extended to cooperate with a cover secured thereto for enclosing the converter elements, together with radial vanes provided on the inner surface of the cover for directing liquid outwardly for the balancing of axial components of force.

An additional object of the invention is to provide for the circulation of liquid between the spaces existing on each side of the web of the first turbine, which web has the cover spaced from one side thereof and the outer shroud of the second turbine spaced from the other side thereof.

In carrying out the foregoing and other objects of the invention, the converter is constructed generally in the manner shown in my copending application, S.N. 403,813, filed January 13, 1954, for Hydrodynamic Torque Converters. The converter comprises a bladed pump, bladed first and second turbines, and a stator or reaction member, the blades of which can have their angularity varied under the control of the operator of the vehicle in which the converter forms a part of the transmission. The first turbine serves to drive the ring gear of a planetary gear set, and the ring gear meshes with the pinions of the carrier which is connected to the second turbine and to the output shaft for the converter. Reaction is provided by a sun gear in mesh with the pinions of the carrier, which sun gear is inhibited against reverse rotation by suitable one-way clutch or brake means. The outer shroud of the pump is extended axially of the converter and has secured thereto a cover member, this outer shroud and the cover member serving to enclose all of the elements of the converter. In order that axial components of force, which may be developed by the liquid circulated by the pump, can be balanced, the cover has a plurality of blades secured to the inner surface thereof adjacent to a part of the web for the first turbine. These blades serve to force liquid which may enter the space between the cover and the first turbine web outwardly to balance the axial forces which may be developed by the liquid circulated by the pump and present in the space between the cover of the converter and the first turbine web. This web in turn is spaced from the outer shroud of the second turbine, and liquid from the pump may enter the space between the web and the outer shroud of the second turbine, there to exert force axially of the converter. This undesirable action is prevented by the provision of radially spaced series of apertures in a part of the first turbine web which permit the circulation of liquid between the two adjacent spaces on each side of the first turbine web.

Figure 2:
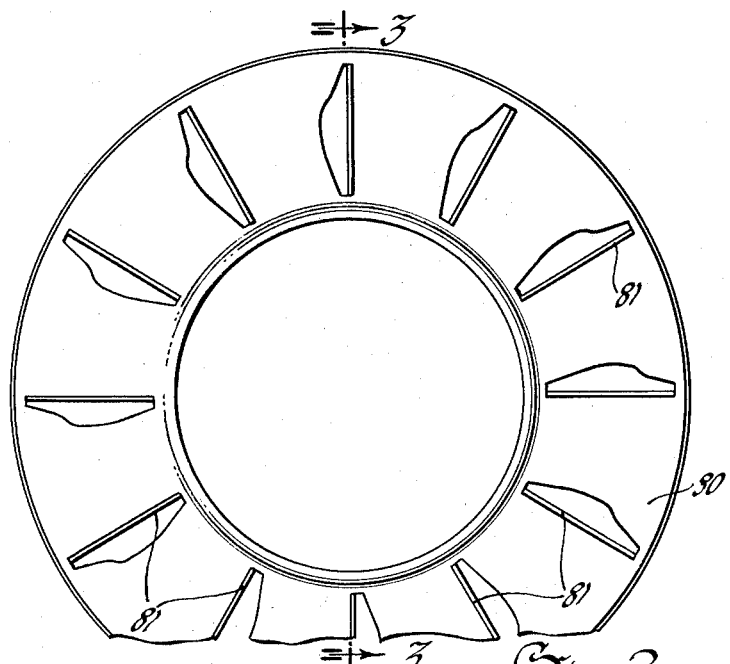
Figure 3:
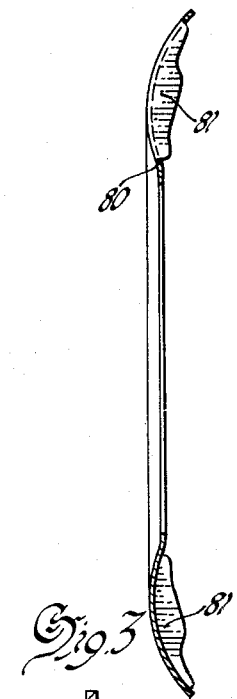
Figure 4:
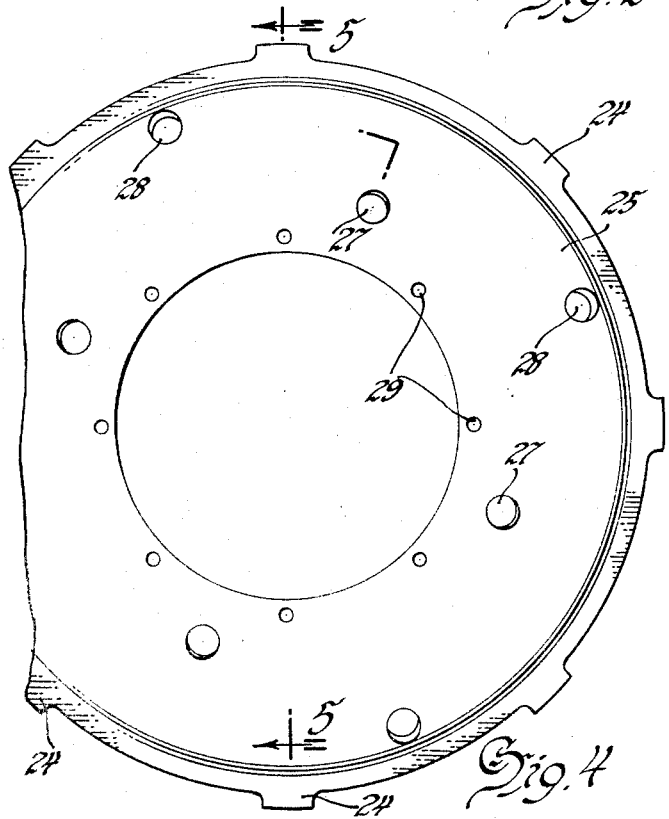
Figure 5:
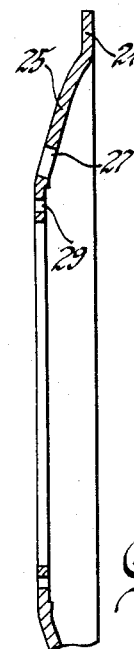

Other features, objects and advantages of the invention will become more readily apparent by reference to the following detailed description of the accompanying drawings wherein:

Fig. 1 is a plan view of the torque converter part of a transmission incorporating the present invention, Fig. 2 is an end view of the sheet metal blade structure secured to the inner surface of the converter cover, Fig. 3 is a section taken substantially on the line 3—3 of Fig. 2, Fig. 4 is an axial view of the first turbine disk forming part of the web for this turbine, and Fig. 5 is a partial vertical section taken substantially on the line 5—5 of Fig. 4.

Referring to the drawings, and particularly to Fig. 1, 10 indicates generally the input of the converter and may actually be the end of the crank shaft of an internal combustion engine, or the like. This member 10 is connected to a flexible blade or disk 11 which in turn is secured to a torque converter indicated generally at 12.

The converter 12 has a pump P made up of inner and outer shrouds 14 and 15, with blades 16 supported therebetween. The outer shroud 15 has a substantially axially extending prolongation 17 which is secured to the outer portion of the flexible plate 11 by bolt and nut combinations 18. A pump cover member in the form of a disk 19 is also secured to the prolongation 17 by these same bolt combinations 18, the cover 19 being interposed between the end of the prolongation 17 and the plate 11. The outer shroud 15 of the pump and its prolongation 17, together with the cover member 19, serve to enclose all of the operating elements of the converter.

The converter also has a first turbine T1 having an inner shroud 20 and an outer shroud 21, which outer shroud in turn has a substantially axially extending prolongation 22, substantially concentric with the prolongation 17. Blades 23 are supported between the shrouds 20 and 21. The outer end of the prolongation 22 is provided with a plurality of recesses to receive ears or splines 24 formed on the periphery of a disk 25 which is attached to the prolongation 22 by the snap ring 26. Disk 25 is provided with two radially spaced series of apertures 27 and 28 (Figs. 4 and 5). The purpose of these apertures will be explained later. The disk 25 also has a plurality of apertures 29 for the passage of rivets 30 which secure the disk to a flange 31 of a ring gear structure which has teeth 32, a cross-axial annulus 34 and a tubular extension 35. The inner surface of the annulus 34 is spaced from the inner surface of the cover member 19 by the thrust washer or bearing 36. The parts 25 and 34 constitute a supporting web for the first turbine T1.

The converter also has a second turbine T2 having an inner shroud 40, an outer shroud 41 and blades 42 supported therebetween. The outer shroud 41 has an extension 44 secured to a planet carrier 45. Carrier 45 serves to support a plurality of pinion gears 46, the teeth of which mesh with the teeth 32 of the ring gear.

The other element of the planetary gear set comprises a sun gear 47 meshing with pinions 46 and mounted for rotation on a stationary sleeve 48 which can be held against rotation by a plug 49 extending through a part of the casing C and the sleeve 48. A one-way brake 50 serves to prevent rotation of the sun gear in one direction. This brake can be in the form of the well-known freewheeling roller brake or may be in the form of a sprag brake. The carrier 45 of the planetary gear unit has tubular extension 51 which is splined to the converter output shaft 52. Thrust washers or bearings 54 and 55 are interposed between the parts 34, 45 and 47.

The remaining element of the converter comprises a stator or reaction member S having outer shroud 55 and an inner hub 56, with a plurality of blades 57 pivotally mounted therebetween. The blades 57 are mounted on shafts 58, the inner ends of which are formed into cranks 59 which in turn are mounted in a piston 60 movable in a cylinder formed in the hub 56. The manner in which the angularity of the blades 57 can be varied has been described in detail in my copending application previously identified, and constitutes no part of the present invention. Secured to the hub 56 for rotation therewith is a race 61 for a one-way brake which has rollers 62 as part thereof. A thrust bearing or washer 71 is positioned between sun gear formation 47 and the stator hub 56.

The converter pump P has a part thereof secured to a cross-axial annulus 69 which has a tubular extension 65 connected to drive a hydraulic pump 66 which serves to supply liquid under pressure to various parts of the transmission which may be associated with the converter and also to supply the liquid used in the converter. Inasmuch as the use of such pumps is well known, the suction line leading thereto and the delivery lines leading therefrom are not described in detail herein. A thrust washer or bearing 70 is positioned between the pump annulus 69 and the stator race 61.

When the converter just described is operated, the pump P discharges liquid into the first turbine T1, which in turn discharges liquid into the second turbine T2 and that in turn discharges liquid into the stator S, the blades of which redirect the liquid into the pump P. At stall, i.e., when the load on the shaft 52 is in such relation to the engine speed, which is also the speed of the pump P, as to hold the two turbines against rotation, the oil actually circulates through the turbines and the stator back to the pump without causing movement of the converter output shaft 52.

When the speed of the pump P rises sufficiently to overcome the torque load on the shaft 52, the first turbine rotates, in turn rotating the ring gear 32 which meshes with the pinions 46, causing rotation of the output shaft 52 and also of the second turbine T2. This rotation of the carrier, its pinions, the output shaft and the second turbine T2 is due to the sun gear 47 furnishing reaction since the one-way brake mechanism 50 prevents the sun gear from rotating in a backward direction relative to the direction of rotation of the pump and turbines. The output shaft 52 is therefore rotating at a reduced rate of speed relative to that of the first turbine T1, which reduction depends on the gear ratio of the planetary unit.

While the second turbine T2, during the initial stages of operation of driving the output shaft 52, in effect has negative torque imposed thereon by the first turbine discharge, the second turbine T2 in compelled to rotate in the same direction as the first turbine. Eventually the second turbine assumes the torque load, at which time the first turbine no longer transmits torque and hence the sun gear 47 is free to rotate in the same forward direction as the first turbine T1, which rotation is permitted by the one-way brake mechanism 50. The converter may still be multiplying torque at this time, and such torque multiplication will continue until the direction of discharge of liquid from the second turbine T2 is such as to cause the stator S to rotate in the forward direction instead of being held against reverse rotation. At this time the action of the converter is that of a fluid coupling.

The foregoing description is true of torque converters with or without the improvements incorporated in the present invention. It has been found in practice that when the converter is at stall, i.e., the pump P rotating while the two turbines and stator are stationary, the liquid being discharged by the pump P develops a pressure which, due to the construction of the converter illustrated, has axial components of force which are undesirable. The pressure of the liquid due to centrifugal force at any point in the circuit is a function of the square of the distance of that point from the center of the converter and, consequently, the pressure developed is at its maximum at the outer shroud end or discharge of the pump P. It will be noted that the turbine T1 is spaced from the pump, and that two prolongations 17 and 22 are also spaced apart. Consequently, liquid at its maximum pressure can travel through the channel provided by the spacing of the prolongations 17 and 22 and enter the space between the cover 19 and the web of the first turbine T1 formed by the disk 25 and the annulus 34 of the ring gear structure. If the inner surface of the cover 19 is substantially smooth, this cover, rotating at the same speed as the pump, will not impart a material centrifugal action on the liquid in the space between the cover and the web of the first turbine. Consequently, the liquid entering this space at maximum pressure is forced inwardly along this space, filling the same until the entire space becomes filled. When this occurs, the liquid tries to exert equal forces on the annulus 34 and that part of the cover 19 immediately opposite the annulus. The force of the oil at maximum pressure on the annulus 34 tends to move it to the right as viewed in Fig. 1, applying pressure or force to the thrust washer or bearing 54, a part of the carrier 45, thrust washer or bearing 55, and the sun gear structure 47. Since at stall, and also during the initiation stages of torque multiplication by the converter, the sun gear 47 is locked against rotation by the one-way brake mechanism 50, it follows that this mechanism may so grip the stationary sleeve 48 as to prevent axial motion of the sun gear to the right. Due to this locking action, the annulus 34, under pressure from the liquid at maximum pressure, cannot yield so that this maximum pressure is exerted entirely upon the part of the pump cover 19 opposite the annulus 34. Such pressure is sufficient to move the pump cover to the left, which motion is permitted by flexing of the flexible plate 11. Since the cover 19 is secured to the shroud of the pump P, it follows that movement or force tending to move the cover to the left establishes a similar motion or tendency on the part of the pump P which is communicated to the thrust washer or bearing 70 between annulus 69 secured to the pump and the race 61 secured to the stator S. The stator S likewise cannot move to the left since such motion is arrested by the sun gear structure 47 which is separated from the hub of the stator S by the thrust washer or bearing 71. Thus, with the stator stationary as at stall or during the stages of torque multiplication by the converter, the thrust bearing 70 is held against rotation and has the thrust of the rotating part 69 of the pump P acting thereon. The maximum pressure developed in the converter and in turn communicated into axial motion by the pump thereof, as just described, imposes a severe load on the thrust bearing 70 which may cause an early failure thereof.

Balacing of the axial components of force developed in the space between the cover 19 and the web of the first turbine T1 could be obtained by providing a return passage for the liquid near the center of the converter. Such return of the liquid is impractical due to the provision of the planetary gear unit and hub of the stator S.

The present invention therefore provides an arrangement whereby this static pressure with its axial components of undesirable character can be balanced, such balancing being obtained by the addition of a plurality of radially extending blades on the inner surface of the cover member 19. These blades may be supplied or formed in any number of suitable modes, one satisfactory mode being illustrated in the drawings, particularly in Figs. 1, 2 and 3. Referring to Figs. 2 and 3, it will be seen that a disk-like metallic member 80 of sheet metal can have a plurality of blades 81 stamped therefrom, and the member 80 may be shaped in the same stamping operation to conform to the shape of the inner surface of the cover member 19. This stamping can then be spot welded or otherwise secured to the cover member.

With the blades 81 so secured to the cover member, or similar blades otherwise secured thereto, it follows that rotation of the cover member, concurrently with the pump P, causes the liquid which enters the space between the cover member and the web of turbine T1 to be directed outwardly, in effect balancing the force which directs liquid outwardly by the pump. This centrifugal action on the liquid by the blades 81 relieves the space between the annulus 34 and the cover 19 of pressure so that the axial force previously described is no longer effective to move the pump P to the left with attendant wear on the thrust bearing 70.

It is also evident that liquid discharged from the turbine T1 can pass through the space between the prolongation 22 of turbine T1 and the outer shroud 41 of turbine T2. This liquid is also at substantially maximum pressure and is forced inwardly toward the hub of the converter, filling the space between the web of the first turbine and the outer shroud of the second turbine. Since the second turbine is secured to the carrier 45, which is held against movement to the right by the sun gear 47 in the manner previously described, the liquid in this last described space would ordinarily exert an axial force, moving the annulus 34 to the left with the same end result of applying extreme thrust on the bearing 70. Accumulation of pressure in the space between the parts of the first and second turbines is prevented by the series of radially spaced apertures 27 and 28 which permit circulation of the liquid out of this space into the space between the web of the turbine T1 of the cover 19, to be forced outwardly by blades 81 in the force balancing operation thereof.

From the foregoing it will be seen that the present invention provides an arrangement whereby axial components of force, which could be developed by the liquid in a converter, are balanced, in one instance by the action of blades, the sole purpose of which is to prevent the accumulation of pressure in a space wherein its presence could be harmful, and in another instance by the provision of apertures which furnish communication between two such spaces. The invention is to be limited only by the following claims.

What is claimed is:

1. In a hydrodynamic torque converter, coaxial rotatable bladed pump, turbine, and stator elements defining a working circuit for liquid, said pump, turbine and stator elements having axially spaced coaxial hubs, thrust bearings for said hubs, means at times substantially holding the hub of said stator against movement, said pump extending substantially radially outwardly from the converter axis of rotation, said pump having outer and inner shrouds, the outer shroud of said pump member having an axial extension, a cross-axial cover member secured to said extension, a turbine receiving the discharge from said pump, said turbine having inner and outer shrouds, said turbine having its outer shroud spaced from said extension and having a cross-axial web in spaced relation to said cover, said web and said cover forming a space for liquid substantially devoid of circulation relative to said working circuit, the pump and turbine being so spaced that liquid discharged by the pump can enter the space between said cover and said web, means for directing liquid in said space between cover and web radially outwardly to balance static pressure in said torque converter thereby to prevent development of unbalanced liquid pressure exerting force to move said cover member and said pump in a direction to cause axial thrust of said pump hub toward said stator hub and a second turbine receiving liquid from said first turbine, said second turbine having inner and outer shrouds, the outer shroud of said second turbine being spaced from said web, the outer shroud of said second turbine and said web forming a space for liquid substantially devoid of circulation relative to said working circuit, said turbines being so spaced that liquid discharged by said first turbine can enter the space between said second turbine shroud and said web, said web being provided with radially spaced series of apertures providing communication between the said spaces.

2. In a hydrodynamic torque converter, coaxial rotatable bladed pump, turbine, and stator elements defining a working circuit for liquid, said pump, turbine and stator elements having axially spaced coaxial hubs, thrust bearings for said hubs, means at times substantially holding the hub of said stator against movement, said pump extending substantially radially outwardly from the converter axis of rotation, said pump having inner and outer shrouds, the outer shroud of said pump member having an axial extension, a cross-axial cover member secured to said extension, a turbine receiving the discharge from said pump, said turbine having inner and outer shrouds, said turbine having its outer shroud spaced from said extension and having a cross-axial web in spaced relation to said cover, said web and said cover forming a space for liquid substantially devoid of circulation relative to said working circuit, the pump and turbine being so spaced that liquid discharged by the pump can enter the space between said cover and said web, a plurality of blades secured to the inner surface of said cover for directing liquid in said space between cover and web radially outwardly to balance static pressure in said torque converter thereby to prevent development of unbalanced liquid pressure exerting force to move said cover member and said pump in a direction to cause axial thrust of said pump hub toward said stator hub, and a second turbine receiving liquid from said first turbine, said second turbine having inner and outer shrouds, the outer shroud of said second turbine being spaced from said web, the outer shroud of second turbine and said web forming a space for liquid substantially devoid of circulation relative to said working circuit, said turbines being so spaced that liquid discharged by said first turbine can enter the space between said second turbine shroud and said web, said web being provided with radially spaced series of apertures providing communication between the said spaces.

3. In a hydrodynamic torque converter, coaxial rotatable bladed pump, turbine, and stator elements defining a working circuit for liquid, said pump, turbine and stator elements having axially spaced coaxial hubs, thrust bearings for said hubs, means at times substantially holding the hub of said stator against movement, said pump extending substantially radially outwardly from the converter axis of rotation, said pump having outer and inner shrouds, the outer shroud of said pump member having an axial extension, a cross-axial cover member secured to said extension, a turbine receiving the discharge from said pump, said turbine having inner and outer shrouds, said turbine member having its outer shroud spaced from said extension and having a cross-axial web in spaced relation to said cover, said web and said cover forming a space for liquid substantially devoid of circulation relative to said working circuit, the pump and turbine being so spaced that liquid discharged by the pump can enter the space between said cover and said web, a plurality of radial blades extending angularly from the inner surface of said cover intermediate its inner and outer edges for directing liquid in said space between cover and web radially outwardly to balance static pressure in said torque converter thereby to prevent development of unbalanced liquid pressure exerting force to move said cover member and said pump in a direction to cause axial thrust of said pump hub, toward said stator hub and a second turbine receiving liquid from said first turbine, said second turbine having inner and outer shrouds, the outer shroud of said second turbine being spaced from said web, the outer shroud of said second turbine and said web forming a space for liquid substantially devoid of circulation relative to said working circuit, said turbines being so spaced that liquid discharged by said first turbine can enter the space between said second turbine shroud and said web, said web being provided with radially spaced series of apertures providing communication between the said spaces.

References Cited in the file of this patent

UNITED STATES PATENTS

| | | |
|---|---|---|
| 2,128,828 | Klepper | Aug. 30, 1938 |
| 2,235,418 | Buchhart | Mar. 18, 1941 |
| 2,264,340 | Sinclair | Dec. 2, 1941 |
| 2,562,464 | Jandasek | July 31, 1951 |
| 2,568,706 | Becker | Sept. 25, 1951 |
| 2,603,984 | Swift | July 22, 1952 |
| 2,616,309 | Russell | Nov. 4, 1952 |
| 2,623,411 | Herndon | Dec. 30, 1952 |